(12) United States Patent
Song et al.

(10) Patent No.: US 11,758,017 B2
(45) Date of Patent: Sep. 12, 2023

(54) DATA ACQUISITION METHOD, SERVICE PROVIDER, SERVICE CONSUMER AND NETWORK FUNCTIONAL ENTITY

(71) Applicants: China Mobile Communication Co., Ltd Research Institute, Beijing (CN); China Mobile Communications Group Co., Ltd., Beijing (CN)

(72) Inventors: Yue Song, Beijing (CN); Xu Chen, Beijing (CN)

(73) Assignees: China Mobile Communication Co., Ltd Research Institute, Beijing (CN); China Mobile Communications Group Co., Ltd., Beijing (CN)

(*) Notice: Subject to any disclaimer, the term of this patent is extended or adjusted under 35 U.S.C. 154(b) by 32 days.

(21) Appl. No.: 16/968,675

(22) PCT Filed: Dec. 29, 2018

(86) PCT No.: PCT/CN2018/125399
§ 371 (c)(1),
(2) Date: Aug. 10, 2020

(87) PCT Pub. No.: WO2019/153963
PCT Pub. Date: Aug. 15, 2019

(65) Prior Publication Data
US 2021/0006639 A1    Jan. 7, 2021

(30) Foreign Application Priority Data
Feb. 11, 2018  (CN) .......................... 201810143297.5

(51) Int. Cl.
G06F 15/16    (2006.01)
G06F 9/54     (2006.01)
(Continued)

(52) U.S. Cl.
CPC ............ *H04L 67/60* (2022.05); *G06F 16/953* (2019.01); *H04L 67/02* (2013.01)

(58) Field of Classification Search
CPC ......... H04L 67/02; H04L 67/32; H04L 67/60; G06F 16/953; G06F 16/954
(Continued)

(56) References Cited

U.S. PATENT DOCUMENTS 11,416,563 B1 *   8/2022  Spagnolo ............. G06F 16/951
2005/0138137 A1 * 6/2005  Encarnacion ......... H04L 67/564
                                                    707/E17.115
(Continued)

FOREIGN PATENT DOCUMENTS

CN    101968811 A    2/2011
CN    103581317 A    2/2014
(Continued)

OTHER PUBLICATIONS

3GPP TS 29.501; 3rd Generation Partnership Project; Technical Specification Group Core Network and Terminals; 5G System; Principles and Guidelines for Services Definition; (Release 15), 19 pages.
(Continued)

*Primary Examiner* — Hamza N Algibhah
(74) *Attorney, Agent, or Firm* — Price Heneveld LLP (57) ABSTRACT

A data acquisition method, a service provider, a service consumer and a network functional entity are provided. The data acquisition method applied to the service provider includes: receiving a service request message initiated by a service consumer for acquiring a resource attribute of a resource, where the service request message carries query information configured to indicate the resource attribute; and sending data of the resource attribute to the service consumer through a service response message.

10 Claims, 4 Drawing Sheets

(51) Int. Cl.
*H04L 29/06* (2006.01)
*H04L 67/60* (2022.01)
*G06F 16/953* (2019.01)
*H04L 67/02* (2022.01)

(58) Field of Classification Search
USPC ........................................ 709/219
See application file for complete search history.

(56) References Cited

U.S. PATENT DOCUMENTS

| | | | |
|---|---|---|---|
| 2011/0119534 A1 | 5/2011 | Liu et al. | |
| 2012/0259946 A1* | 10/2012 | Stockhammer | H04N 21/8456 709/217 |
| 2014/0304678 A1 | 10/2014 | Zhang | |
| 2016/0080833 A1* | 3/2016 | Denoual | H04N 21/84 725/116 |
| 2017/0223138 A1 | 8/2017 | Amiri et al. | |
| 2018/0253415 A1* | 9/2018 | Halai | G06F 21/602 |
| 2018/0343590 A1 | 11/2018 | Wang et al. | |
| 2019/0058900 A1* | 2/2019 | Ramaley | H04N 21/26258 |
| 2019/0320304 A1* | 10/2019 | Wu | H04L 67/10 |
| 2020/0092696 A1* | 3/2020 | Ly | H04L 69/329 |
| 2021/0006639 A1* | 1/2021 | Song | G06F 16/953 |

FOREIGN PATENT DOCUMENTS

| | | |
|---|---|---|
| CN | 104023073 A | 9/2014 |
| CN | 107026882 A | 8/2017 |
| CN | 107622127 A | 1/2018 |

OTHER PUBLICATIONS

Method of acquiring URL parameters, xiaolizhenzhen, "Short Book", https://www.jianshu.com/p/df5ddlbfb055, URL Publication dated Feb. 7, 2018, 7 pages.

* cited by examiner

DATA ACQUISITION METHOD, SERVICE PROVIDER, SERVICE CONSUMER AND NETWORK FUNCTIONAL ENTITY

CROSS REFERENCE OF RELATED APPLICATION

The present application is the U.S. national phase of PCT Application PCT/CN2018/125399 filed on Dec. 29, 2018, which claims a priority of Chinese patent application No. 201810143297.5 filed on Feb. 11, 2018, which is incorporated herein by reference in its entirety.

TECHNICAL FIELD

The present disclosure relates to the field of communication technology, in particular to a data acquisition method, a service provider, a service consumer and a network function entity.

BACKGROUND

The core network of the future 5G communication system will adopt a service-oriented architecture. Under the service-oriented architecture, network function entities interact with each other through service-oriented interfaces, and the service-oriented interfaces have been explicitly defined to call data using the HTTP/2+TCP protocol.

The servicing interface in the related technology transmits data at a granularity of resources, and a service request initiated by the service consumer to the service provider through the servicing interface can only read one resource. Different from communication systems in related art, 5G communication systems will have diversified service requests, and each service request requires a different combination of data. If the service consumer requests multiple data at the same time, there are three data acquisition solutions based on the service interface in related art:

1) The service provider defines all data in a resource. After the service consumer initiates a service request, the service provider sends the entire resource to the service consumer. The disadvantage of this solution is that the service provider can only send the full amount of data of the resource to the service consumer. If the service consumer only expects to acquire a part of the data in the resource, it will also obtain some useless data at the same time, so the utilization ratio of the transmission resource is low.
2) The service provider defines a resource for each data combination, and the service provider only needs to provide the service consumer with the resource corresponding to the desired data. The disadvantage of this solution is that it requires a lot of resources to support the combination of different data, the same data will be stored by multiple resources at the same time, and the utilization ratio of the storage resource of service provider is not high.
3) The service provider defines a resource for each data, and the service consumer provides the resource corresponding to the desired data. The disadvantage of this solution is that when the service consumer wants to acquire multiple data, it needs to initiate multiple service requests to the service provider, so the acquisition efficiency is low and the overhead is large, the association relationship of the storage space or data and resources is more complicated.

It can be seen that the data acquisition method of the service-oriented interface in the related art cannot be flexibly applied to different service requests, so it needs to be re-standardized.

SUMMARY

In one aspect, data acquisition method applied to a service provider is provided in an embodiment of the present disclosure, including:

receiving a service request message initiated by a service consumer for acquiring a resource attribute of a resource, where the service request message carries query information configured to indicate the resource attribute; and sending data of the resource attribute to the service consumer through a service response message.

In some embodiments of the present disclosure, the data of the resource is configured with a corresponding code according to the resource attribute, and the query information is a code of the resource attribute.

In some embodiments of the present disclosure, where the service response message further carries a code associated with the data of the resource attribute.

In some embodiments of the present disclosure, in the case that there are at least two resource attributes, the service request message carries a set of codes of the resource attributes.

In some embodiments of the present disclosure, in the case that there are a plurality of resource attributes and the resource attributes correspond to continuous codes, the continuous codes are represented by a range in the set.

In some embodiments of the present disclosure, the service request message is sent according to a GET sending mode in a Hypertext Transfer Protocol, and the code or the set of codes of the resource attribute is represented by a content of a query parameter in the GET mode.

In some embodiments of the present disclosure, the code of the resource attribute is a one-level code or a multi-level code, and the multi-level code includes at least a first-level subcode and a second-level subcode.

In another aspect, data acquisition method applied to a service consumer is further provided in an embodiment of the present disclosure, including:

in the case that a resource attribute of a resource is to be acquired, sending a service request message for the resource to a service provider, where the service request message carries query information configured to indicate the resource attribute; and receiving a service response message fed back by the service provider for the service request message, where the service response message carries data of the resource attribute.

In some embodiments of the present disclosure, the data of the resource is configured with a corresponding code according to the resource attribute, and the query information is a code of the resource attribute.

In some embodiments of the present disclosure, in the case that there are at least two resource attributes, and the service request message carries a set of codes of the resource attributes.

In some embodiments of the present disclosure, in the case that there are a plurality of resource attributes and the resource attributes correspond to continuous codes, the continuous codes are represented by a range in the set.

In some embodiments of the present disclosure, the sending the service request message for the resource to the service provider includes:

sending to the service provider the service request message for the resource according to a GET sending mode in a Hypertext Transfer Protocol, where the code or the set of codes of the resource attribute is represented by a content of a query parameter in the GET mode.

In some embodiments of the present disclosure, the code of the resource attribute is a one-level code or a multi-level code, and the multi-level code includes at least a first-level subcode and a second-level subcode.

In another aspect, a service provider is further provided in an embodiment of the present disclosure, including:

a first receiving module, configured to receive a service request message initiated by a service consumer for acquiring a resource attribute of a resource, where the service request message carries query information configured to indicate the resource attribute; and a first sending module, configured to send data of the resource attribute to the service consumer through a service response message.

In some embodiments of the present disclosure, the data of the resource is configured with a corresponding code according to the resource attribute, and the query information is a code of the resource attribute.

In some embodiments of the present disclosure, the service response message further carries a code associated with the data of the resource attribute.

In some embodiments of the present disclosure, in the case that there are at least two resource attributes, the service request message carries a set of codes of the resource attributes.

In some embodiments of the present disclosure, in the case that there are a plurality of resource attributes and the resource attributes correspond to continuous codes, the continuous codes are represented by a range in the set.

In some embodiments of the present disclosure, the service request message is sent according to a GET sending mode in a Hypertext Transfer Protocol, and the code or the set of codes of the resource attribute is represented by a content of a query parameter in the GET mode.

In some embodiments of the present disclosure, the code of the resource attribute is a one-level code or a multi-level code, and the multi-level code includes at least a first-level subcode and a second-level subcode.

In another aspect, a service consumer is further provided in an embodiment of the present disclosure, including:

a second sending module, configured to, in the case that a resource attribute of a resource is to be acquired, send a service request message for the resource to a service provider, where the service request message carries query information configured to indicate the resource attribute; and a second receiving module, configured to receive a service response message fed back by the service provider for the service request message, where the service response message carries data of the resource attribute.

In some embodiments of the present disclosure, the data of the resource is configured with a corresponding code according to the resource attribute, and the query information is a code of the resource attribute.

In some embodiments of the present disclosure, in the case that there are at least two resource attributes, and the service request message carries a set of codes of the resource attributes.

In some embodiments of the present disclosure, in the case that there are a plurality of resource attributes and the resource attributes correspond to continuous codes, the continuous codes are represented by a range in the set.

In some embodiments of the present disclosure, the second sending module is further configured to: send to the service provider the service request message for the resource according to a GET sending mode in a Hypertext Transfer Protocol, where the code or the set of codes of the resource attribute is represented by a content of a query parameter in the GET mode.

In some embodiments of the present disclosure, the code of the resource attribute is a one-level code or a multi-level code, and the multi-level code includes at least a first-level subcode and a second-level subcode.

In another aspect, a network functional entity is further provided in an embodiment of the present disclosure, including: a processor, a memory and a computer program stored in the memory and executable on the processor, where the processor executes the computer program to perform the data acquisition method applied to the service provider or the data acquisition method applied to the service consumer.

In another aspect, a computer-readable storage medium is further provided in an embodiment of the present disclosure, where a computer program is stored in the computer-readable storage medium, and a processor executes the computer program to perform the data acquisition method applied to the service provider or the data acquisition method applied to the service consumer.

DETAILED DESCRIPTION

In order to make the technical issues to be solved, technical solutions and features clearer, the present disclosure will be described in detail with reference to the drawings and embodiments. In the following description, specific details such as specific configurations and components are provided only to help a comprehensive understanding of the embodiments of the present disclosure. Therefore, it should be clear to those skilled in the art that various changes and modifications can be made to the embodiments described herein without departing from the scope of the present disclosure. In addition, for clarity and conciseness, descriptions of known functions and configurations are omitted.

It should be understood that "one embodiment" or "an embodiment" mentioned throughout the specification means that a specific feature, structure, or characteristic related to the embodiment is included in at least one embodiment of the present disclosure. Therefore, "in one embodiment" or "in an embodiment" in various places throughout the specification do not necessarily refer to the same embodiment. In addition, these specific features, structures or characteristics can be combined in one or more embodiments in any suitable manner.

In the various embodiments of the present disclosure, it should be understood that the size of the sequence number of the following processes does not mean the order of execution. The execution order of each process should be determined by its function and internal logic, and should not be implemented in the present disclosure. The implementation process of the example constitutes any limitation.

The objective of the present disclosure is to solve the technical issues in the related art that the data acquisition method of the service-oriented interface in the related art cannot be flexibly applied to different service requests, the data acquisition method of the service-oriented interface is re-standardized.

Figure 1:
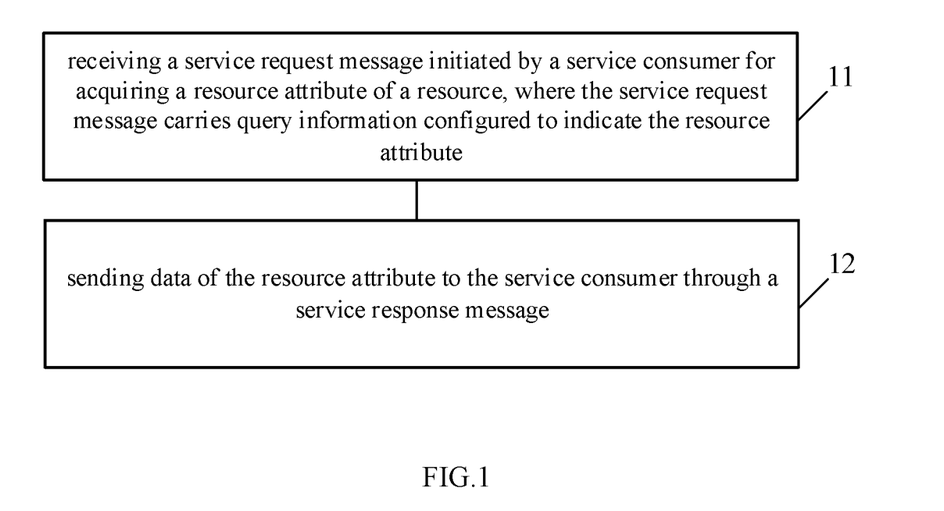
FIG. 1 is a schematic diagram of the steps of applying the data acquisition method in an embodiment of the disclosure to the service provider.

On the one hand, data acquisition method is provided in an embodiment of the present disclosure, which is applied to a service provider (the service provider may be the network function entity hereinabove). As shown in FIG. 1, the data acquisition method includes:

Step 11: receiving a service request message initiated by a service consumer for acquiring a resource attribute of a resource, where the service request message carries query information configured to indicate the resource attribute.

Specifically, the above-mentioned resource attribute may include one or more resource attributes, may be a part of the parameters in the resource, or may be all the parameters in the resource.

Step 12: sending data of the resource attribute to the service consumer through a service response message.

Specifically, in this step, the service provider may determine the resource attributes that the service consumer expects to acquire from the above resources, according to the query information carried in the service request message, instead of determining, through the service request message, the resource that the service consumer expects to acquire as in the related art.

It can be seen that, a mapping for the data in the resource is configured according to the resource attribute. The service consumer specifies the specific data to be acquired to the service provider through improved query information, so that the service provider effectively provides the corresponding data instead of the full data of the entire resource, so the service interface realizes a more flexible data interaction.

Based on the embodiment of the present disclosure, for the service provider, resources can be defined for different service requests. Therefore, compared with the technical solution in related art, it has the following characteristics:

1) It solves the issue in the related art that the HTTP protocol cannot adapt to the different business processes of the 5G network to read 5G data flexibly, and overcomes the resource model design limit;

2) When the 5G data is subsequently expanded, the newly added data is realized by adding new resource attributes and their codes, without paying attention to resource combination and modifying resource models, thereby making data expansion more flexible; and 3) Avoid the invalid storage space occupation when a large amount of the same data is shared by multiple resources, such as storing by resource on the server; or if not storing by resource on the server, avoid the increasing complexity of the association relationship between data and resources.

The data acquisition method in the embodiment of the present disclosure will be described in detail below.

Exemplarily, in this embodiment, the data of the resource may be configured with a corresponding code according to the resource attribute, and the above query information may be the code of the resource attribute.

The resource attribute code of all data in the resource may be a sequential code, or a combination of characters without sequence, or a code generated by a code technique in any related art.

When the service consumer requests to acquire at least two resource attributes, the service request message carries a set of codes of resource attributes.

For example, there are four resource attributes requested by the service consumer, and the corresponding codes are 1, 4, 5, and 6, and the set of codes carried in the service request message is (1, 4, 5, 6).

Optionally, if the resource attribute requested by the service consumer corresponds to a continuous code, the continuous code can also be expressed by a range in the set.

For example, when the resource attributes requested by the service consumer are four, and the corresponding codes are 1, 4, 5, and 6, then the service request message carries the code set as (1, 4-6), and the 4-6 in the set represents resource attributes 4, 5, 6.

Of course, when the resource attribute codes in the above resources are represented by letters, the set of codes carried in the service request message is (A, D-F), then D-F represents resource attributes D, E, and F.

When the resource attribute code in the above resource is represented by any code, the set of codes carried in the service request message is (code 1, code 2, code 3). Regarding the data in the structured resource, this embodiment may use multi-level code to represent the resource attributes of the sub-resources contained in the resource. That is, the code of the resource attribute of the sub-resource of the resource is composed of at least a first-level subcode and a second-level subcode.

For example, the code of the resource attribute of the data in the structured resource may be 1.1, 1.2, 1.3, and so on, where one digit before the decimal point and one digit after the decimal point are the first-level subcode and the second-level subcode respectively.

The code of the resource attribute of the data in the structured resource can also be expressed in the same general form, for example, the $M^{th}$ resource attribute (sub-resource) code of the resource/the $N^{th}$ resource attribute (sub-resource) code of the resource/ . . . /the $F^{th}$ resource attribute (sub-resource) code of the resource.

For example, the data of the 5G communication system in the related technology may be divided into different resources such as subscription data, service data, policy data, consumer context data, identification data, and code number data.

Based on the multi-level code, different types of data such as subscription data, service data, and policy data may be defined in a consumer's network data resources. The subscription data, service data, and policy data are taken as sub-resource data. The resource attributes of different data of the subscription data sub-resource is represented by 1.X, the resource attributes of different data of the service data sub-resource is represented by 2.X, and the resource attributes of different data of the policy data sub-resource is represented by 3.X, and the representation form of the resource attributes of different data of sub-resources in other resources (such as user context data, identification data, number data) can be done in the same manner.

Alternatively, the resource attributes of different data of the subscription data sub-resource is represented by subscription data sub-resource code/resource attribute code, the resource attributes of different data of the service data sub-resource is represented by service data sub-resource code/resource attribute code, and the resource attributes of different data of the policy data sub-resource is represented by policy data sub-resource code/resource attribute code, and the rest can be done in the same manner.

The "." or "/" in the multi-level code represent a connector between different levels of in the code, and any connector can be used.

Obviously based on the above-mentioned multi-level code, the service provider may define all data in the same resource for service requests, and each data may be accurately represented through the multi-level code.

In addition, in practical applications, the service response message fed back to the service consumer in this embodiment further carries a code associated with data of the resource attribute.

For example, it is assumed that the data in a resource acquired by the service consumer includes resource attribute 1, resource attribute 2, and resource attribute 3, and the corresponding codes are code 1, code 2, and code 3.

According to code 1, code 2, and code 3, the service provider determines from the resource that the data of resource attribute 1, resource attribute 2, and resource attribute 3 are Data1, Data1, and Data3.

After that, the service response message fed back by the service provider to the service consumer may include: Data1-encode1, Data2-encode2, and Data3-encode3.

After receiving the service response message, the service consumer may identify each data in the resource according to the code. For example, according to the code 1 in Data1-code 1, it can be identified that Data1 corresponds to the data of resource attribute 1; according to the code 2 in Data2-code 2, it can be recognized that Data2 corresponds to the data of resource attribute 2.

Specifically, the service request message in the embodiment of the present disclosure may be sent according to a GET sending mode in a Hypertext Transfer Protocol, and the code or the set of codes of the resource attribute is represented by a content of a query parameter in the GET mode.

For example: query_parameter1 is used to represent the query parameter, and the value of the query parameter query_parameter1 in the GET method is used to specify the code of the resource attribute to be obtained. Assuming that there are three resource attributes to be obtained, the corresponding codes are code 1, code 2, and code 3, the service request message may carry query parameters as: query_parameter1=(code 1, code 2, code 3). Assuming that there are three resource attributes to be obtained, the corresponding codes are code 1, code 2, and code 3, the service request message may carry query parameters as follows: query_parameter1=(code 1, code 2, code 3) or query_parameter1= (code 1-3).

In the above embodiment, query_parameter1 is used to represent the query parameter, and the query parameter may also be represented by other characters (for example, English, numbers, and/or symbols, etc.).

The service provider may determine the resource attribute data that the service consumer expects to acquire through the value of query_parameter1 in the service request message.

Of course, the foregoing encode as query information is only a feasible solution in the specific embodiment of the present disclosure. As other solutions, the specific embodiment of the present disclosure may also use other methods to represent the parameters in the resource.

Figure 2:
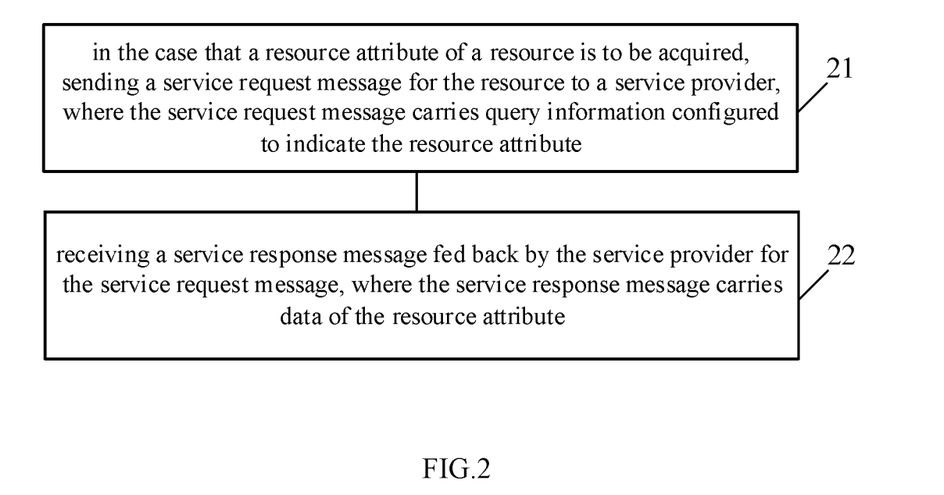
FIG. 2 is a schematic diagram of the steps of applying the data acquisition method in an embodiment of the disclosure to the service consumer end.

On the other hand, data acquisition method applied to a service consumer is further provided in another embodiment of the present disclosure. As shown in FIG. 2, the data acquisition method includes:

Step 21: in the case that a resource attribute of a resource is to be acquired, sending a service request message for the resource to a service provider, where the service request message carries query information configured to indicate the resource attribute;

Step 22: receiving a service response message fed back by the service provider for the service request message, where the service response message carries data of the resource attribute.

According to method of in the embodiment, a mapping for the data in the resource is configured according to the resource attribute. The service consumer specifies the data to be obtained to the service provider, through the query information in the service request message, so that the service provider may effectively provide corresponding data. Obviously, such data acquisition method is more flexible.

Based on the method in the embodiment of the present disclosure, when the service consumer expects to acquire the data of a certain resource attribute in a certain resource, the query information of the resource attribute will be carried in the service request message of the resource to inform the service provider. According to the query information in the service request message, the service provider may directly feedback the data of the corresponding parameter in the resource to the service consumer. It can be seen that, according to the data acquisition method in the embodiment, the service consumer may directly acquire the data in the desired resource, so this data acquisition method is more flexible.

The data acquisition method of the embodiment of the present disclosure will be described in detail below.

For example, the data of the resource in the embodiment is configured with a corresponding code according to the resource attribute, and the above query information may be the code of the resource attribute.

When there are at least two resource attributes, the service consumer may carry a set of codes of resource attributes in the service request message.

For example: there are four resource attributes, and the corresponding codes are 1, 4, 5, 6, and the service consumer can carry the set of codes (1, 4, 5, 6) in the service request message to inform the service provider.

Optionally, if the resource attribute corresponds to a continuous code, the continuous code may also be represented by a range in the set.

For example, when the code of the resource attribute is 1, 4, 5, 6, then the set of codes carried in the service request message is (1, 4-6), the 4-6 in this set represent resource attributes 4, 5, and 6.

In addition, in practical applications, the service response message fed back to the service consumer in this embodiment also carries: a code associated with data of the resource attribute.

For example, it is assumed that the resource attributes in a resource obtained by the service consumer include resource attribute 1, resource attribute 2, and resource attribute 3, and the corresponding codes are code 1, code 2, and code 3.

According to code 1, code 2, and code 3, the service provider determines from the resource that the data of resource attribute 1, resource attribute 2, and resource attribute 3 are Data1, Data1, and Data3. After that, the service provider feeds back a service response message to the service consumer, and the service response message may include: Data1-Code1, Data2-Code2, and Data3-Code2.

After receiving the service response message, the service consumer may identify each data according to the code. For example, according to the code 1 in Data1-Code 1, it can be recognized that Data1 is the data of resource attribute 1; according to the code 2 in Data2-Code 2, it can be recognized that Data2 is the data of resource attribute 2.

Specifically, when step 21 is performed, the service request message for the resource may be sent to the service provider the service request message is sent according to a GET sending mode in a Hypertext Transfer Protocol, and the code or the set of codes of the resource attribute is represented by a content of a query parameter in the GET mode.

For example: query_parameter1 is used to represent the query parameter, and the value of the query parameter query_parameter1 in the GET method is used to specify the code of the resource attribute to be obtained. Assuming that there are three resource attributes to be obtained, the corresponding codes are code 1, code 2, and code 3, the service request message may carry query parameters as: query_parameter1=(code 1, code 2, code 3). Assuming that there are three resource attributes to be obtained, the corresponding codes are code 1, code 2, and code 3, the service request message may carry query parameters as: query_parameter1=(code 1, code 2, code 3) or query_parameter1=(code 1-3).

The service provider may determine the resource attribute data that the service consumer expects to acquire through the value of query_parameter1 in the service request message.

Of course, the foregoing encode as query information is only a feasible solution in the specific embodiment of the present disclosure. As other solutions, the specific embodiment of the present disclosure may also use other methods to represent the parameters in the resource.

For example, when the data in the resources of this embodiment is divided into resource attributes with multiple structures, this embodiment may use multi-level code to represent the resource attributes of the sub-resources contained in the resources. That is, the code of the resource attribute of the sub-resource of the resource is composed of at least a first-level subcode and a second-level subcode.

For example, the code of the resource attribute of the data in the structured resource may be 1.1, 1.2, 1.3, and so on. One digit before the decimal point and one digit after the decimal point are the first-level subcode and the second-level subcode respectively. The multi-code manner may further divide the data in the resource according to the resource attribute.

For example, the data of the 5G communication system in the related technology may be divided into different resources such as subscription data, service data, policy data, consumer context data, identification data, and code number data.

Based on the multi-level code, different types of data such as subscription data, service data, and policy data may be defined in a consumer's network data resources. The subscription data, service data, and policy data are taken as sub-resource data. The resource attributes of different data of the subscription data sub-resource is represented by 1.X, the resource attributes of different data of the service data sub-resource is represented by 2.X, and the resource attributes of different data of the policy data sub-resource is represented by 3.X, and the representation form of the resource attributes of different data of sub-resources in other resources (such as consumer context data, identification data, code number data) can be done in the same manner.

Alternatively, the resource attributes of different data of the subscription data sub-resource is represented by subscription data sub-resource code/resource attribute code, the resource attributes of different data of the service data sub-resource is represented by service data sub-resource code/resource attribute code, and the resource attributes of different data of the policy data sub-resource is represented by policy data sub-resource code/resource attribute code, and the rest can be done in the same manner.

The "." or "/" in the multi-level code represent a connector between different levels of in the code, and any connector can be used.

Further, the subscription data may be further divided into: the first type of service subscription data, the second type of service subscription data, . . . , and the $N^{th}$ type of service subscription data.

Correspondingly, in this embodiment, the code of the first type of service subscription data is 1.1 whish is used to represent the data in the first type of service subscription data; similarly, the code of the $N^{th}$ type of service subscription is 1.N which is used to represent data in the $N^{th}$ type of service subscription data.

Obviously, based on the above-mentioned multi-level code, the service provider may define all data in the same resource for service requests, and each data may be accurately expressed through multi-level code. It should be noted that, for more levels of code representation, since the principle is the same, that will not be repeated with examples.

In the following, the data acquisition method of the present disclosure will be introduced in detail in different embodiments in conjunction with the service provider and the service consumer.

As the 5G communication system has clarify that the service-oriented interface uses the HTTP/2+TCP protocol to call data, in this embodiment, the service consumer requests acquiring the data in the resource from the service provider, through the GET sending mode in the HTTP protocol.

Figure 3:
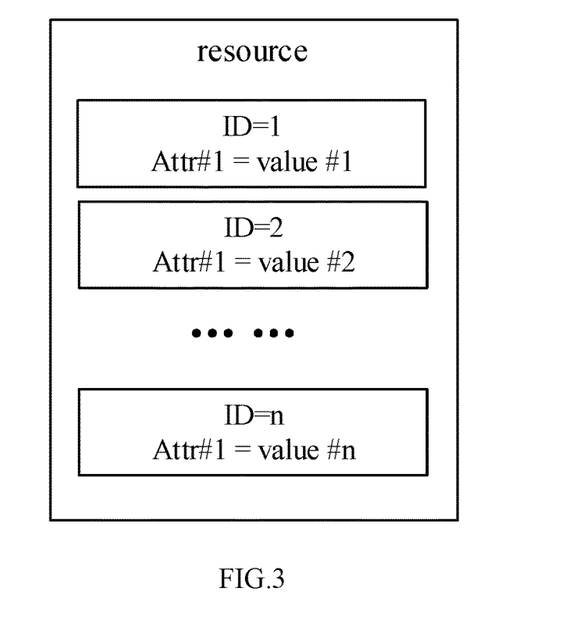
FIG. 3 is a schematic diagram of the structure of resources on the service provider side in an embodiment of the disclosure.

For example, the model structure of the resources at the service provider side is shown in FIG. 3.

Resource represents a resource, and it can be seen from FIG. 3 that the data in the resource is divided into n resource attributes, and each resource attribute is configured with a code (1, 2, . . . , n).

Take the resource attribute with code 1 as an example, its data is Attr #1=value #1, and similarly the data of the resource attribute with code 2 is Attr #2=value #2, . . . , the data of the resource attribute with code n is Attr #n=value #n.

Figure 4:
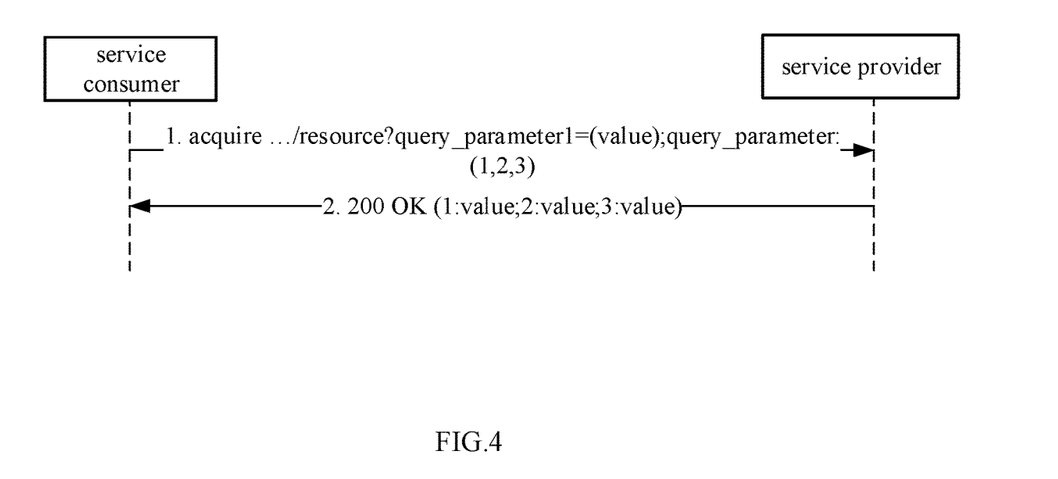
FIG. 4 is a schematic flowchart of data acquisition method provided by an embodiment of the disclosure in practical application.

Assuming that the service consumer is to acquire the parameters of the resource with the resource attribute code=1, 2, 3, the corresponding process is shown in FIG. 4.

The service consumer may expand the representation of the query parameter in the GET (acquisition) method in the service request message, specify the resource by query_parameter1 (query_parameter1)=value (value), and request the service provider for the resource attributes 1, 2, and 3 of the resource by carrying the resource attribute code set. The service provider, through the 200OK message in the service response message, provides the service consumer with the value of the resource attributes 1, 2, and 3 in the resource (1: value, 2: value, 3: value).

Figure 5:
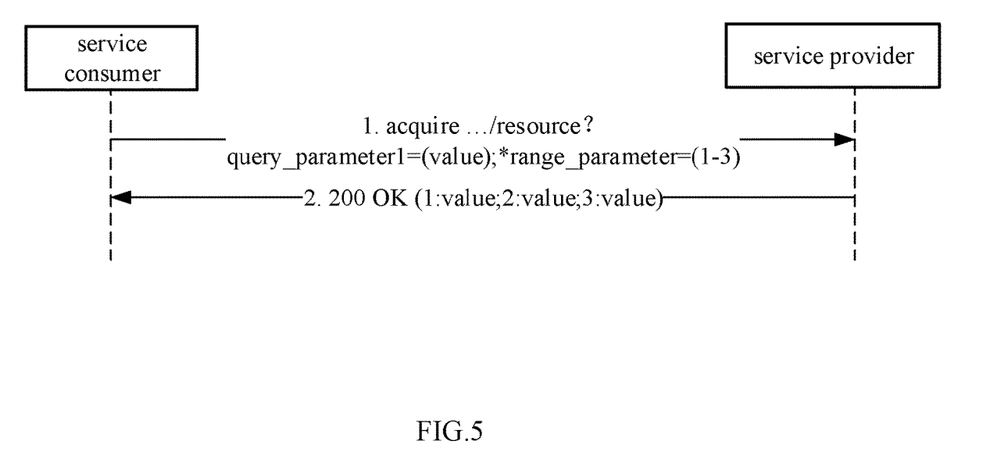
FIG. 5 is a schematic flowchart of another practical application of the data acquisition method in an embodiment of the disclosure.

Alternatively, as shown in FIG. 5, the service consumer may expand the representation of the GET method in the service request message and introduce the parameter range. The resource is specified through query_parameter1=value, and the resource attribute 1, 2, and 3 of the resource is requested from the service provider by carrying the resource attribute code range. The service provider, through the 200OK message in the service response message, provides the service consumer with the value of the resource attributes 1, 2, and 3 in the resource (1: value, 2: value, 3: value).

The above is an introduction to the data acquisition method of the present disclosure. It should be noted that the foregoing implementation manners are only used as examples, and cannot limit the protection scope of the present disclosure. Reasonable changes can be made without departing from the principles of the present disclosure. For example, there may be multiple resource attributes in the above practical application, and the query information may also be replaced by other methods, for example, the name of the resource attribute is directly used as the query information.

Figure 6:
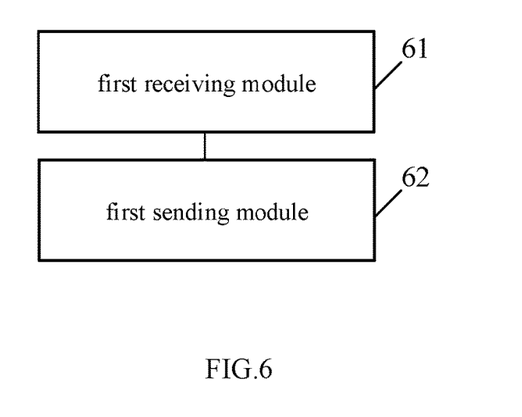
FIG. 6 is a schematic diagram of the logical structure of the service provider in an embodiment of the disclosure.

In addition, a service provider is further provided in another embodiment of the present disclosure, as shown in FIG. 6, the service provider includes:
  a first receiving module 61, configured to receive a service request message initiated by a service consumer for acquiring a resource attribute of a resource, where the service request message carries query information configured to indicate the resource attribute; and
  a first sending module 62, configured to send data of the resource attribute to the service consumer through a service response message.

Obviously, the service provider of the embodiment of the present disclosure is the executive body of the data acquisition method applied to the service provider in the present disclosure. Therefore, the technical effect that the data acquisition method can achieve can also be achieved by the service provider of this embodiment.

Optionally, the data of the resource is configured with a corresponding code according to the resource attribute, and the query information is a code of the resource attribute.

Optionally, the service response message further carries a code associated with the data of the resource attribute.

Optionally, in the case that there are at least two resource attributes, the service request message carries a set of codes of the resource attributes.

Optionally, in the case that there are a plurality of resource attributes and the resource attributes correspond to continuous codes, the continuous codes are represented by a range in the set.

Optionally, the service request message is sent according to a GET sending mode in a Hypertext Transfer Protocol, and the code or the set of codes of the resource attribute is represented by a content of a query parameter in the GET mode.

Optionally, the code of the resource attribute is a one-level code or a multi-level code, and the multi-level code includes at least a first-level subcode and a second-level subcode.

Figure 7:
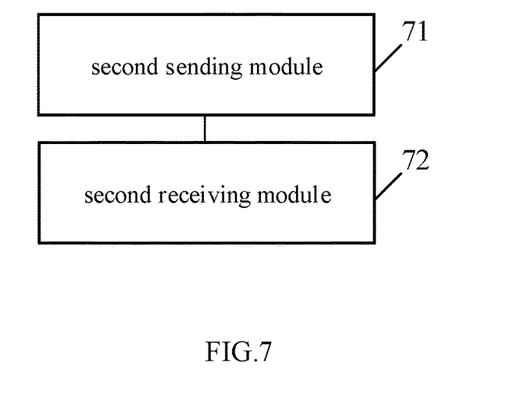
FIG. 7 is a schematic diagram of a logical structure of a service consumer provided by an embodiment of the disclosure.

In addition, a service consumer is further provided in another embodiment of the present disclosure, as shown in FIG. 7, the service consumer includes:
  a second sending module 71, configured to, in the case that a resource attribute of a resource is to be acquired, send a service request message for the resource to a service provider, wherein the service request message carries query information configured to indicate the resource attribute; and
  a second receiving module 72, configured to receive a service response message fed back by the service provider for the service request message, wherein the service response message carries data of the resource attribute.

Obviously, the service consumer of the embodiment of the present disclosure is the executive body of the data acquisition method applied to the service consumer in the present disclosure. Therefore, the technical effect that the data acquisition method can achieve can also be achieved by the service consumer of this embodiment.

Optionally, the data of the resource is configured with a corresponding code according to the resource attribute, and the query information is a code of the resource attribute.

Optionally, in the case that there are at least two resource attributes, the service request message carries a set of codes of the resource attributes.

Optionally, in the case that there are a plurality of resource attributes and the resource attributes correspond to continuous codes, the continuous codes are represented by a range in the set.

Optionally, the service request message is sent according to a GET sending mode in a Hypertext Transfer Protocol, and the code or the set of codes of the resource attribute is represented by a content of a query parameter in the GET mode.

Optionally, the code of the resource attribute is a one-level code or a multi-level code, and the multi-level code includes at least a first-level subcode and a second-level subcode.

Figure 8:
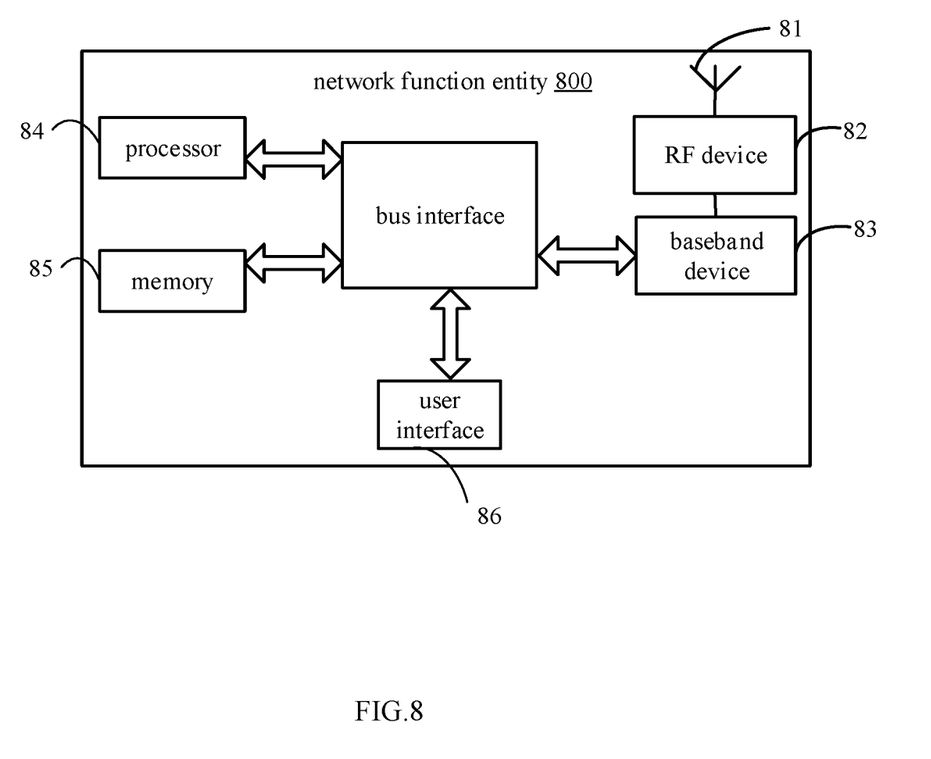
FIG. 8 is a schematic diagram of the physical structure of a network function entity provided by an embodiment of the disclosure.

In addition, as shown in FIG. 8, a network function entity 800 is further provided in another embodiment of the present disclosure, including:
  an antenna 81, a radio frequency device 82, a baseband device 83, a processor 84, a memory 85, a user interface 86, and a bus interface.

In the embodiment of the present disclosure, the network side device (i.e., the network function entity) 800 may serve as a service consumer or a service provider.

The network side device 800 also includes: a computer program stored in the memory 85 and executable on the processor 84.

When the network side device 800 serves as a service provider, the processor executes the computer program to:
  receive a service request message initiated by a service consumer for acquiring a resource attribute of a resource, where the service request message carries query information configured to indicate the resource attribute; and
  send data of the resource attribute to the service consumer through a service response message, according to the indication of the query information carried by the service request message.

When the network side device 800 serves as a service consumer, the processor executes the computer program to:
  in the case that a resource attribute of a resource is to be acquired, send a service request message for the resource to a service provider, where the service request message carries query information configured to indicate the resource attribute; and
  receive a service response message fed back by the service provider for the service request message, where the service response message carries data of the resource attribute.

The bus interface may include any number of interconnected buses and bridges. Specifically, one or more processors represented by the processors and various circuits of the memory represented by the memory 85 are linked together. The bus architecture can also link various other circuits such as peripherals, voltage regulators, power management circuits, etc., which are all known in the art, and therefore, no further description will be given herein. The bus interface provides the interface. The antenna 81, the radio frequency device 82, and the baseband device 83 together form a transmitter and a receiver, and provide a unit for communicating with various other devices on the transmission medium. For different consumer equipment, the consumer interface 86 may also be an interface capable of connecting externally and internally with the required equipment. The connected equipment includes but not limited to a keypad, a display, a speaker, a microphone, a joystick, etc.

The processor 84 is responsible for managing the bus interface and general processing, and the memory 85 can store data used by the processor 84 when performing operations.

Optionally, the data of the resource is configured with a corresponding code according to the resource attribute, and the query information is a code of the resource attribute.

Optionally, in the case that there are at least two resource attributes, the service request message carries a set of codes of the resource attributes.

Optionally, in the case that there are a plurality of resource attributes and the resource attributes correspond to continuous codes, the continuous codes are represented by a range in the set.

Optionally, when the network side device 800 serves as a service consumer, the processor 84 executes the computer program to:

send the service request message to the service provider according to a GET sending mode in a Hypertext Transfer Protocol, where the code or the set of codes of the resource attribute is represented by a content of a query parameter in the GET mode.

In addition, a computer-readable storage medium is further provide din another embodiment of the present disclosure, where a computer program is stored therein, and a processor executes the computer program to:

receive a service request message initiated by a service consumer for acquiring a resource attribute of a resource, where the service request message carries query information configured to indicate the resource attribute; and send data of the resource attribute to the service consumer through a service response message, according to the indication of the query information carried by the service request message;

or, in the case that a resource attribute of a resource is to be acquired, send a service request message for the resource to a service provider, where the service request message carries query information configured to indicate the resource attribute; and receive a service response message fed back by the service provider for the service request message, where the service response message carries data of the resource attribute.

Optionally, the data of the resource is configured with a corresponding code according to the resource attribute, and the query information is a code of the resource attribute.

Optionally, in the case that there are at least two resource attributes, the service request message carries a set of codes of the resource attributes.

Optionally, in the case that there are a plurality of resource attributes and the resource attributes correspond to continuous codes, the continuous codes are represented by a range in the set.

Optionally, the service request message is sent according to a GET sending mode in a Hypertext Transfer Protocol, and the code or the set of codes of the resource attribute is represented by a content of a query parameter in the GET mode.

Optionally, the code of the resource attribute is a one-level code or a multi-level code, and the multi-level code includes at least a first-level subcode and a second-level subcode.

The above are some embodiments of the present disclosure. It should be noted out that for those of ordinary skill in the art, without departing from the principles described in the present disclosure, several improvements and modifications may be made. These improvements and modifications should also be regarded as the scope of the present disclosure.

What is claimed is:

1. A data acquisition method, applied to a service provider, comprising:

receiving a service request message initiated by a service consumer for acquiring a resource attribute of a resource, wherein the service request message carries query information configured to indicate the resource attribute; and sending data of the resource attribute to the service consumer through a service response message;

wherein the data of the resource is configured with a corresponding code according to the resource attribute, and the query information is a code of the resource attribute;

the service response message carries the data of the resource attribute and the code of the resource attribute which is associated with the data of the resource attribute;

when the code of the resource attribute is a multi-level code, the multi-level code comprises at least a first-level subcode and a second-level subcode;

wherein the resource attribute represents a resource data type, the data of the resource attribute is configured to indicate a data belonging to the resource data type, and the code of the resource attribute is configured to at least identify the resource data type;

the first-level subcode in the multi-level code is configured to identify the resource data type, and the second-level subcode in the multi-level code is configured to indicate the corresponding resource data belonging to the resource data type.

2. The data acquisition method according to claim 1, wherein in the case that there are at least two resource attributes, the service request message carries a set of codes of the resource attributes;

wherein in the case that there are a plurality of resource attributes and the resource attributes correspond to continuous codes, the continuous codes are represented by a range in the set;

wherein the service request message is sent according to a GET sending mode in a Hypertext Transfer Protocol, and the code or the set of codes of the resource attribute is represented by a content of a query parameter in the GET mode.

3. A network functional entity, comprising: a processor, a memory and a computer program stored in the memory and executable on the processor, wherein the processor executes the computer program to perform the data acquisition method according to claim 1.

4. A data acquisition method, applied to a service consumer, comprising:
in the case that a resource attribute of a resource is to be acquired, sending a service request message for the resource to a service provider, wherein the service request message carries query information configured to indicate the resource attribute; and
receiving a service response message fed back by the service provider for the service request message, wherein the service response message carries data of the resource attribute;
wherein the data of the resource is configured with a corresponding code according to the resource attribute, and the query information is a code of the resource attribute;
the service response message further carries the code of the resource attribute which is associated with the data of the resource attribute;
when the code of the resource attribute is a multi-level code, and the multi-level code comprises at least a first-level subcode and a second-level subcode;
wherein the resource attribute represents a resource data type, the data of the resource attribute is configured to indicate a data belonging to the resource data type, and the code of the resource attribute is configured to at least identify the resource data type;
the first-level subcode in the multi-level code is configured to identify the resource data type, and the second-level subcode in the multi-level code is configured to indicate the corresponding resource data belonging to the resource data type.

5. The data acquisition method according to claim 4, wherein in the case that there are at least two resource attributes, and the service request message carries a set of codes of the resource attributes;
wherein in the case that there are a plurality of resource attributes and the resource attributes correspond to continuous codes, the continuous codes are represented by a range in the set;
wherein the sending the service request message for the resource to the service provider comprises:
sending to the service provider the service request message for the resource according to a GET sending mode in a Hypertext Transfer Protocol, wherein the code or the set of codes of the resource attribute is represented by a content of a query parameter in the GET mode.

6. A service consumer, comprising: a processor, a memory and a computer program stored in the memory and executable on the processor, wherein the processor executes the computer program to perform the data acquisition method according to claim 4.

7. The service consumer according to claim 6, wherein in the case that there are at least two resource attributes, and the service request message carries a set of codes of the resource attributes;
wherein in the case that there are a plurality of resource attributes and the resource attributes correspond to continuous codes, the continuous codes are represented by a range in the set;
wherein the second sending module is further configured to: send to the service provider the service request message for the resource according to a GET sending mode in a Hypertext Transfer Protocol, wherein the code or the set of codes of the resource attribute is represented by a content of a query parameter in the GET mode.

8. A network functional entity, comprising: a processor, a memory and a computer program stored in the memory and executable on the processor, wherein the processor executes the computer program to perform the data acquisition method according to claim 4.

9. A service provider, comprising: a processor, a memory and a computer program stored in the memory and executable on the processor, wherein the processor executes the computer program to:
receive a service request message initiated by a service consumer for acquiring a resource attribute of a resource, wherein the service request message carries query information configured to indicate the resource attribute; and
send data of the resource attribute to the service consumer through a service response message;
wherein the data of the resource is configured with a corresponding code according to the resource attribute, and the query information is a code of the resource attribute;
the service response message carries the data of the resource attribute and the code of the resource attribute which is associated with the data of the resource attribute;
when the code of the resource attribute is a multi-level code, and the multi-level code comprises at least a first-level subcode and a second-level subcode;
wherein the resource attribute represents a resource data type, the data of the resource attribute is configured to indicate a data belonging to the resource data type, and the code of the resource attribute is configured to at least identify the resource data type;
the first-level subcode in the multi-level code is configured to identify the resource data type, and the second-level subcode in the multi-level code is configured to indicate the corresponding resource data belonging to the resource data type.

10. The service provider according to claim 9, wherein in the case that there are at least two resource attributes, the service request message carries a set of codes of the resource attributes;
wherein in the case that there are a plurality of resource attributes and the resource attributes correspond to continuous codes, the continuous codes are represented by a range in the set;
wherein the service request message is sent according to a GET sending mode in a Hypertext Transfer Protocol, and the code or the set of codes of the resource attribute is represented by a content of a query parameter in the GET mode.

* * * * *